United States Patent [19]

Oppenlaender et al.

[11] 4,436,639

[45] Mar. 13, 1984

[54] AMMONIUM SALTS OF POLYMALEIC ACIDS AND USE AS CORROSION INHIBITORS IN WATER-IN-OIL EMULSIONS

[75] Inventors: Knut Oppenlaender, Ludwigshafen; Karl Stork, Lampertheim; Klaus Barthold, Mannheim, all of Fed. Rep. of Germany

[73] Assignee: BASF Aktiengesellschaft, Ludwigshafen, Fed. Rep. of Germany

[21] Appl. No.: 376,284

[22] Filed: May 10, 1982

[30] Foreign Application Priority Data

May 15, 1981 [DE] Fed. Rep. of Germany ....... 3119376

[51] Int. Cl.$^3$ .......................... C09K 7/02; C23F 11/14
[52] U.S. Cl. ................................ 252/8.55 E; 166/273; 166/274; 166/275; 252/392; 422/12
[58] Field of Search .......................... 252/8.55 E, 392; 422/12; 166/273–275

[56] References Cited

U.S. PATENT DOCUMENTS

| | | | |
|---|---|---|---|
| 3,762,873 | 10/1973 | Oudeaunk | 422/12 |
| 3,963,636 | 6/1976 | Harris et al. | 252/8.55 E |
| 4,018,702 | 4/1977 | Boffardi et al. | 252/390 |
| 4,105,581 | 8/1978 | Sexsmith | 252/389.2 |
| 4,240,925 | 12/1980 | Tait | 252/8.55 E |
| 4,297,237 | 10/1981 | Boffardi | 252/389.2 |
| 4,344,862 | 8/1982 | Widder et al. | 422/12 |
| 4,351,796 | 9/1982 | Marshall | 252/389.2 |

*Primary Examiner*—Christine M. Nucker
*Attorney, Agent, or Firm*—David L. Hedden

[57] ABSTRACT

The subject invention relates to salts of polymaleic acids having a molecular weight between 200 and 1500 and to their use in preventing the corrosion of metal caused by hydrogen sulfide and carbon dioxide in water-in-oil emulsions such as crude oil.

5 Claims, No Drawings

AMMONIUM SALTS OF POLYMALEIC ACIDS AND USE AS CORROSION INHIBITORS IN WATER-IN-OIL EMULSIONS

BACKGROUND OF THE INVENTION

1. Field of the Invention

The invention relates to salts of low molecular weight polymaleic acids and to their use as corrosion inhibitors in water-in-oil emulsions. The inhibitors are particularly useful in preventing the corrosion of metals caused by hydrogen sulfide and carbon dioxide in water-in-oil, particularly in saltwater-in-oil emulsions.

2. Description of the Prior Art

It is known to inject a solution or dispersion of corrosion inhibitors in crude oil during oil recovery and in the transport and storage of crude oil so that a protective layer forms on the surface of the metal parts coming in contact with the oil. The crude oil emulsions usually contain saltwater and, in many cases, depending upon the origin of the oil, hydrogen sulfide and carbon dioxide which have a pronounced corrosive effect. The corrosion inhibitors used for this purpose should be soluble in oil and should be at least dispersible in saltwater so that they can have an optimum effect.

Such systems are described in German Published application No. 28 46 977. These are imidazolinium salts which when used are dissolved in an oil-soluble organic solvent and in the presence of a hydrocarbon oil. The problem with such systems lies in the relatively complicated mode of metering three components and the fact that the corrosion protection is not satisfactory in all cases. We have determined, for instance, that the imidazoline having the formula

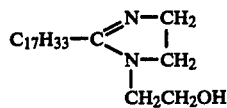

described in the referenced publication (as chloride) does not develop sufficient effectiveness to counteract the corrosive erosion caused by the action of hydrogen sulfide.

Thus, an object of this invention was to find organic compounds which are optimally effective against the hydrogen sulfide and carbon dioxide corrosion in saltwater-in-oil emulsions and which are uniformly distributable in both phases without additional solvents.

Polymaleic acids in their free form or as simple salts are known as corrosion inhibitors from U.S. Pat. Nos. 4,105,581 and 4,018,702 as well as German published application 28 06 342. However, these substances only work in systems with pure water since they are not oil-soluble and require additions of phosphates or phosphonates (U.S. Pat. No. 4,105,581 and German published application 28 02 342), or zinc ions (U.S. Pat. No. 4,018,702) in order to bring about optimum results.

According to an earlier suggestion (U.S. patent application P No. 30 39 977), the oligomaleinates to be used in accordance with this invention are used as corrosion inhibitors in mineral oils, among other substances, also against hydrogen sulfide. In this case, the corrosion is, among other things, caused by hydrogen sulfide containing condensed water which does not form an emulsion with the oil. It is emphasized in this older application that the oligomaleinates are oil-soluble and do not have an emulsifying effect, that is, that they are not emulsifiable let alone soluble in the condensed water. It must, therefore, be all the more surprising that the materials can now be used in saltwater-in-oil emulsions, that is, that they are equally distributed in the water and the oil phase in such a manner that they can equally protect the corrosion endangered metal parts which are contacted by the oil as well as the water contrary to the problems described in Application P No. 30 39 977. This newly determined property thus facilitates the valuable expanded form of application of this invention.

SUMMARY OF THE INVENTION

The subject invention relates to salts of polymaleic acids having a molecular weight between 200 and 1500 and to their use in preventing the corrosion of metal caused by hydrogen sulfide and carbon dioxide in water-in-oil emulsions such as crude oil.

DESCRIPTION OF THE PREFERRED EMBODIMENTS

The ammonium salts of this invention are primary, secondary or tertiary amines of oligomaleic acids having molecular weights of 200 to 1500 with the alkyl or alkenyl radicals of the amine containing 9 to 20 carbon atoms. Particularly preferred are the $C_{12}$-$C_{16}$ alkyl amine salts, particularly the mono- or dialkyl ammonium salts of which the monoisotridecyl ammonium salts are of particular interest.

The oligomaleic acids on which the salts are based can be obtained according to various methods which are a part of the current state of the art. According to British Pat. No. 1,349,969, for instance, maleic anhydride (MA) is polymerized in an inert solvent in the presence of acetic anhydride and hydrogen peroxide. A similar method is described in German Published Application 20 74 340 according to which acetic anhydride and hydrogen peroxide are also added to the polymerization mixture. A preferred method is described in German Published Application 28 40 167. This method permits preparation of hydrolyzed oligomaleic acid in one operation from maleic anhydride resulting in products which are not discolored compared with the above-referenced methods. Specifically, maleic anhydride is dissolved in 1 to 5 times the molar quantity (100 to 500 mole percent based on MA) of acetic anhydride and 0.2 to 0.5 times the molar quantity (20 to 50 mole percent based on MA) of hydrogen peroxide is added at 80° C. to 140° C., preferably in the form of a 30 to 50 percent aqueous solution. After this addition, the reaction takes place at 100° C. to 140° C., preferably at 100° C. to 120° C., within a period of time of 1 to 8 hours.

The hydrogen peroxide can be added immediately or gradually. Preferably, the hydrogen peroxide is slowly fed into the reaction mixture at the above-mentioned temperatures while the reaction mixture is vigorously agitated. The preferred feed period is 1 hour to 5 hours.

In order to accelerate the reaction and to improve the yields and the purity of the polymers, it has proved to be advantageous to add small quantities, from 0.1 to 3 percent by weight based on MA, preferably 0.1 to 2 percent by weight of an inorganic or organic acid to the reaction mixture.

Such acids are non-oxidizing and examples include hydrochloric acid, sulfuric acid, orthoboric acid, p-toluic acid, phosphoric acid, tartaric acid, citric acid and/or adipic acid.

A similarly positive effect is achieved by adding reduction agents, primarily acids with a reducing effect which are added in the same quantities as the above-mentioned acids. Preferred reduction agents include hydrazine, hydroxylamines and their salts, followed by hydroquinone, pyrogallol, aldehydes, such as formaldehyde, acetaldehyde or glutaraldehyde, and reducing acids which are recommended on a preferred basis since they combine the reducing capacity and the acid effect include hypophosphorus acid, phosphorus acid, sulfurus acid, followed by aldehydic acids such as glyoxylic acid, phenol carboxylic acids such as salicylic acid, and saccharic acids such as ascorbic acid. Oxalic acid can also be successfully used as reducing acid.

The ammonium salts according to this invention are obtained by simple mixing and/or neutralizing of the resultant oligomaleic acid with an amine in an equivalent ratio of 1:1 until a pH value of approximately 7 is reached. The amines of use have the formula

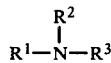

where $R^1$ and $R^2$ are the same or different and may be H or a $C_9$-$C_{20}$ alkyl, or $C_9$-$C_{20}$ alkenyl radical and $R_3$ is a $C_9$-$C_{20}$ alkyl or $C_9$-$C_{20}$ alkenyl radical.

The salts according to this invention may be added directly to the emulsions or prediluted in a solvent in quantities of 100 to 10,000 ppm, preferably 100 to 500 ppm.

Suitable solvents include, for instance, aromatic hydrocarbons or aliphatic alcohols and/or alcohol mixtures with 6 to 12 carbon atoms.

The examples below explain the invention in more detail. All parts are by weight unless otherwise stated.

EXAMPLES (A) Preparation of oligomaleic acid

| Ingredients | Parts |
| --- | --- |
| maleic anhydride (MA) | 1000 |
| acetic anhydride | 1400 |
| $H_3PO_3$ | 10 |
| 35 percent by weight aqueous $H_2O_2$ solution | 857 |

Maleic anhydride and the catalyst were dissolved in acetic anhydride at room temperature in a reaction vessel with reflux, cooler, stirrer, drip funnel and internal thermometer. The 35 percent hydrogen peroxide solution was dripped into the reaction mixture while the latter was being stirred at 105° C. to 110° C. within a period of approximately five hours. The solution turns dark but lightens toward the end of the reaction. In order to complete the polymerization, the mixture was stirred for another approximately two hours at approximately 110° C. At this point the low boiling components (water, acetic acid) were removed by distillation at a pressure of approximately 30 to 75 mbar and an internal temperature of 120° C. Following this process the material was dried in a drying chamber. A quantitative yield of product having a molecular weight of approximately 650 was obtained.

(B) Preparation of salts

EXAMPLE 1

146.25 parts (0.225 moles) of the polymaleic acid prepared above was dissolved in 146.25 parts of water while being stirred. The mixture was subsequently adjusted to a pH of 7 at a temperature of 50° C. to 60° C. using 320 parts of (1.61 moles) mono-iso-tridecylamine. The mixture was stirred until a constant pH is maintained. Two phases result. The aqueous phase was separated and discarded. The organic phase was evaporated until dry in a vacuum of approximately 20 mbar at 70° C.

EXAMPLE 2

107.25 parts (0.165 moles) of the polymaleic acid prepared above was dissolved in 107.25 parts of water while the mixture was being stirred. Subsequently the mixture was adjusted to a pH of 7 at 50° C. to 60° C. using 402 parts (1.056 moles) of tridecylamine. The mixture was stirred until a constant pH can be maintained. Two phases form. The aqueous phase was separated and discarded and the organic phase was evaporated until dry in a vacuum of approximately 20 mbar at 70° C.

EXAMPLE 3

65 parts (0.1 mole) of the polymaleic acid prepared above was dissolved in 65 parts of water. Following this procedure, 207 parts of a $C_8$-$C_{12}$ alcohol mixture ("Oxooil") was added and 142 parts (0.715 mole) of mono-iso-tridecylamine was dripped into the mixture resulting in a pH value of approximately 7. After stirring for 1 hour at 70° C. to 80° C., the water was removed by distillation at 20 mbar and 70° C.

(C) Application

The corrosion inhibitors were tested in accordance with the so-called dynamic or "wheel" test. This is a test method commonly used in the recovery of crude oil in order to test inhibitors. The test samples were sheet iron rectangles with dimensions of 130 mm × 10 mm × 1 mm. These were sanded, degreased with toluene and weighed. Test gasoline containing 50 percent by weight of saltwater with 3 percent NaCl content in emulsified form was used as the test medium. In order to simulate field conditions, the test medium was saturated with hydrogen sulfide and carbon dioxide and was poured into test bottles. The inhibitors to be tested were then added in amounts of 250 ppm. The strips of test metal were fastened to the bottle covers and were placed into the test medium.

The test bottles were thereupon fastened to a rotating axis (wheel) which rotated in an 80° C. water bath at a speed of 40 rpm. The test period was 16 hours. After being removed from the bottle, the test strips were cleaned with an inhibiting acid, degreased, dried and were weighed in order to determine the weight loss. The results were evaluated by way of a comparison with a control value (test without added inhibitor).

The results are shown in the following table.

TABLE

| Compound according to | Weight Loss (mg/sample) |
| --- | --- |
| Example 1 | 19.2 |
| Example 2 | 23.8 |
| Example 3 | 19.0 |
| Comparison* | 51.0 |

| Compound according to | Weight Loss (mg/sample) |
|---|---|
| H₃₃C₁₇—C(=N—CH₂)(N—CH₂)—CH₂CH₂OH  Cl⁻ (with N—CH₂CH₂OH) | |
| Control value | 98.3 |

*in accordance with German Published Application 28 46 977

The embodiments of the invention in which an exclusive privilege or property is claimed are defined as follows:

1. A polymaleic acid salt obtained by reacting a polymaleic acid having a molecular weight of 200 to 1500 with an amine having the formula $$\begin{array}{c} R^2 \\ | \\ R^1-N-R^3 \end{array}$$

in which $R^1$ and $R^2$ are the same or different and are H or $C_9-C_{20}$ alkyl or $C_9-C_{20}$ alkenyl radical and $R^3$ is a $C_9-C_{20}$ alkyl or $C_9-C_{20}$ alkenyl radical.

2. The salt of claim 1 wherein the amine is mono-iso-tridecylamine.

3. The salt of claim 1 wherein the acid has a molecular weight of approximately 650.

4. A water-in-oil emulsion containing from 100 ppm to 10,000 ppm of a salt of claim 1.

5. The emulsion of claim 4 wherein the salt is the reaction product of a polymaleic acid having a molecular weight of approximately 650 and a mono-iso-tridecylamine.

* * * * *